(12) United States Patent
Wu et al.

(10) Patent No.: US 9,749,475 B2
(45) Date of Patent: Aug. 29, 2017

(54) METHOD AND APPARATUS FOR REDUCING DISTORTION ECHO

(71) Applicant: Spreadtrum Communications (Shanghai) Co., Ltd., Zhangjiang, Shanghai (CN)

(72) Inventors: Sheng Wu, Shanghai (CN); Bin Jiang, Shanghai (CN); Fuhuei Lin, Shanghai (CN); Jingming Xu, Shanghai (CN); Ye Yuan, Shanghai (CN); Yaqin Yong, Shanghai (CN); Wei Ji, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 0 days.

(21) Appl. No.: 14/969,487

(22) Filed: Dec. 15, 2015

(65) Prior Publication Data

US 2016/0189700 A1 Jun. 30, 2016

(30) Foreign Application Priority Data

Dec. 30, 2014 (CN) .......................... 2014 1 0857165

(51) Int. Cl.
*H04B 3/20* (2006.01)
*H04R 3/00* (2006.01)
*H04M 9/08* (2006.01)

(52) U.S. Cl.
CPC ................................... *H04M 9/082* (2013.01)

(58) Field of Classification Search
CPC ......... G10K 2210/00; G10K 2210/108; G10K 2210/3028; G10K 2210/3022; G10K 2210/3023; G10K 2210/3014; G10K 2210/505; H04B 3/237; H04R 1/1083; H04R 3/00; H04R 2410/05; H04M 9/082
See application file for complete search history.

(56) References Cited

U.S. PATENT DOCUMENTS

| | | | | |
|---|---|---|---|---|
| 2005/0220292 A1* | 10/2005 | Okumura | ............ | H04M 9/082 379/406.12 |
| 2006/0013383 A1* | 1/2006 | Barron | ................. | H04M 9/082 379/406.01 |
| 2008/0101622 A1* | 5/2008 | Sugiyama | ............ | H04M 9/082 381/66 |

(Continued)

*Primary Examiner* — Thang Tran
(74) *Attorney, Agent, or Firm* — Cantor Colburn LLP (57) ABSTRACT

Method and apparatus for reducing distortion echo are provided. K-path amplification and pre-distortion process are performed to the downlink reference signal to obtain K-path pre-distorted signals. Afterwards, filtering is performed using the self-adaptive filters which correspond to the downlink reference signal x(t) and the K-path pre-distorted signals to obtain the filtering signals. Error signals are obtained by calculating differences between the target signal and each of the filtering signals. The minimum-value fusion process is performed to the error signals to obtain the residual signal which is then output as the final self-adaptive echo cancellation. In embodiments of the present disclosure, the residual signal is relatively small as the minimum-value fusion process is performed to the error signals. That is to say, echo loss is relatively great. Therefore, the method may provide echo loss with high amplitude under a situation that a speaker has relatively serious distortion.

16 Claims, 4 Drawing Sheets

(56) References Cited

U.S. PATENT DOCUMENTS

| | | | |
|---|---|---|---|
| 2010/0184488 A1* | 7/2010 | Takada | H04R 3/00 455/570 |
| 2010/0223311 A1* | 9/2010 | Sugiyama | H04M 9/082 708/322 |
| 2011/0124380 A1* | 5/2011 | Wang | H04M 9/082 455/570 |
| 2013/0188759 A1* | 7/2013 | Jain | H04L 27/2649 375/343 |
| 2015/0187348 A1* | 7/2015 | Kang | G10L 21/0208 381/66 |

* cited by examiner

METHOD AND APPARATUS FOR REDUCING DISTORTION ECHO

CROSS-REFERENCE TO RELATED APPLICATIONS

The present application claims priority to Chinese patent application No. 201410857165.0, filed on Dec. 30, 2014, and entitled "METHOD AND APPARATUS FOR REDUCING DISTORTION ECHO", and the entire disclosure of which is incorporated herein by reference.

FIELD OF THE DISCLOSURE

The present disclosure generally relates to echo technology field, and more particularly, to a method and apparatus for reducing distortion echo.

BACKGROUND OF THE DISCLOSURE

In audio systems, echo interference cannot be avoided due to a signal reflection path. In audio communications, echoes generally classified to electric echoes and acoustic echoes. Electric echoes are caused by signal reflection which is generated due to impedance mismatch. Acoustic echoes are generally generated in below scenario. At a receptor side, voice from a speaker is received by a voice receiving device and then sent to a speaker side. The acoustic echoes include direct echo and indirect echo. The voice which comes from the speaker and then directly received by the voice receiving device is called the direct echo. The voice which comes from the speaker are reflected for one or more than one time through different paths (for example, buildings or any objects in buildings) and then all the reflected voice is received by the voice receiving device, which is called the indirect echo. Echoes are sent to the speaker side after channel delay and heard by a speaker at the speaker side, which causes interference to audios at the speaker side, reduces audio clearness, and affects audio communication quality.

Figure 1:
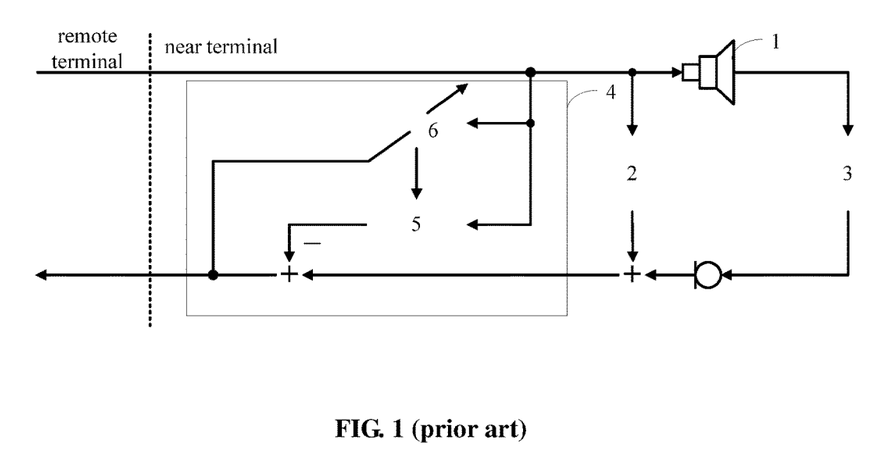
FIG. 1 schematically illustrates a block diagram of a self-adaptive echo cancellation system in existing techniques.

In the sixties of the 20th century, to eliminate the influence to audio communications caused by echoes, Sondhi in Bell Labs raised a self-adaptive filtering method to realize echo cancellation. FIG. 1 schematically illustrates a block diagram of a self-adaptive echo cancellation system. Referring to FIG. 1, before being played out by a speaker 1 in a near terminal, a downlink reference signal that comes from a remote terminal forms an electric echo through an electric echo path 2. After the downlink reference signal is played out by the speaker 1, the played out signal is absorbed by a microphone through an acoustic echo path 3, to form an acoustic echo. A self-adaptive filter 4 performs filtering to the downlink reference signal using an echo path model 5. An output signal of the filtering (namely, a cancellation signal) may cancel the echoes, and a residual signal (namely, an error signal) after the cancellation is sent to the remote terminal. Besides, a self-adaptive filtering algorithm 6 adjusts parameters of the echo path model 5 using the downlink reference signal and the residual signal, to reduce residual echoes gradually.

In echo cancellation technologies, as acoustic echoes have features such as multi-path, long delay, slow attenuation, time variation and nonlinear, acoustic echo cancellation (AEC) has strict requirements on the performance of the self-adaptive filter 4. To a handheld device which is seriously nonlinear, the requirements on the self-adaptive filter 4 may be stricter. As a handheld device is relatively small, a micro speaker therein is much smaller than a normal speaker. To satisfy volume requirement in hands-free communication, the micro speaker generally works in a nonlinear region, which results in more serious audio distortion. In this situation, the self-adaptive filter 4 may provide very small echo loss and works unsteadily. The self-adaptive filter 4 may provide no echo loss when facing a transient signal. Therefore, a method and apparatus for reducing distortion echo, which can steadily provide echo loss with high amplitude under a situation that a speaker has relatively serious distortion, are required.

SUMMARY

In embodiments of the present disclosure, a method and apparatus for reducing distortion echo are provided, which can steadily provide echo loss with high amplitude under a situation that a speaker has relatively serious distortion.

In an embodiment of the present disclosure, a method for reducing distortion echo is provided, including: performing K-path amplification to a downlink reference signal x(t) to obtain K-path preprocessed signals, where K is a positive integer; performing a pre-distortion process to the K-path preprocessed signals, respectively, to obtain K-path pre-distorted signals $r_k(t)$, where k=1, 2, . . . , K; performing a filtering process to the downlink reference signal x(t) and each of the K-path pre-distorted signals using a self-adaptive filter which corresponds to the downlink reference signal x(t) and the corresponding pre-distorted signal, to obtain (K+1) path filtering signals; calculating differences between a target signal d(t) and each of the (K+1) path filtering signals to obtain (K+1) path error signals; performing a minimum-value fusion process to the (K+1) path error signals to obtain a residual signal e(t); and outputting the residual signal e(t) as a final self-adaptive echo cancellation.

Optionally, a pre-distortion mapping function used in the pre-distortion process meets the following equation:

$$r_k(t) = f_k(p_k(t)),$$

where $r_k(t)$ is a $k^{th}$-path pre-distorted signal, $p_k(t)$ is a $k^{th}$-path preprocessed signal, $f_k(x) \neq cx$, $f_k(x) \neq c$, c is a constant, and k=1, 2, . . . , K.

Optionally, to control an input range and an output range of the pre-distortion mapping function by normalization, the pre-distortion mapping function meets the following equation:

$$r_k(t) = x_{max} f_k\left(\frac{p_k(t)}{x_{max}}\right)$$

where $x_{max}$ is a maximum amplitude of the downlink reference signal x(t), $-1 \leq f_k(x) \leq 1$, and k=1, 2, . . . , K.

Optionally, when an echo path model in the self-adaptive filter is a time-domain model $h_{k,t}$, the error signal is represented as follows:

$$e_0(t) = d(t) - y_0(t),$$

$$y_0(t) = h_{0,t} \otimes x(t) = \sum_{m=1}^{M} h_{0,t}(m)x(t-M+m),$$

$$e_k(t) = d(t) - y_k(t),$$

$$y_k(t) = h_{k,t} \otimes r_k(t) = \sum_{m=1}^{M} h_{k,t}(m) r_k(t - M + m),$$

where $e_0(t)$ is the error signal corresponding to the downlink reference signal x(t), d(t) is the target signal, $y_0(t)$ is the filtering signal corresponding to the downlink reference signal x(t), $h_{0,t}$ is an $M^{th}$-order Finite Impulse Response (FIR) filter at a t time point, $h_{0,t} = [h_{0,t}(1), h_{0,t}(2), \ldots, h_{0,t}(M)]^T$, $e_k(t)$ is an error signal corresponding to each of the K-path pre-distorted signals $r_k(t)$, $y_k(t)$ is an error signal corresponding to each of the K-path pre-distorted signals $r_k(t)$, $h_{k,t}$ is an $M^{th}$ FIR filter at a $K^{th}$ t time point, $h_{k,t} = [h_{k,t}(1), h_{k,t}(2), \ldots, h_{k,t}(M)]^T$, k=1, 2, . . . , K, superscript T is a transposition symbol, $\otimes$ is a convolution symbol, t is a time index, M is an order number and satisfies the echo path model, M is within a range from $0.01*f_s$ to $f_s$, and $f_s$ is sampling frequency.

Optionally, when the echo path model in the self-adaptive filter is a time-domain model $h_{k,t}$, the echo path model corresponding to each path pre-distorted signal is updated to:

$$h_{k,t+1} = h_{k,t} + \Delta h_{k,t},$$

where $\Delta h_{k,t}$ is the updated item of the coefficient of the self-adaptive filter, $\Delta h_{k,t}$ is an $M^{th}$-order vector, M is a positive integer, and k=1, 2, . . . , K.

Optionally, when the echo path model in the self-adaptive filter is a frequency-domain model $H_{k,t}$, the error signals $e_0(t), e_1(t), \ldots, e_K(t)$ are represented by:

$$e_0(t) = d(t) - y_0(t)$$

$$[y_0(t-(N-M)+1), y_0(t-(N-M)+2), \ldots, y_0(t)]^T = [0_{(N-M) \times M} I_{(N-M) \times (N-M)}] F^-[H_{0,t} \cdot R_{0,t}]$$

$$e_k(t) = d(t) - y_k(t),$$

$$[y_k(t-(N-M)+1), y_k(t-(N-M)+2), \ldots, y_k(t)]^T = [0_{(N-M) \times M} I_{(N-M) \times (N-M)}] F^-[H_{k,t} \cdot R_{k,t}],$$

where $e_0(t)$ is the error signal corresponding to the downlink reference signal x(t), d(t) is the target signal, $y_0(t)$ is the filtering signal corresponding to the downlink reference signal x(t), $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M) \times M}$ is a zero matrix having (N-M) rows and M columns, $I_{(N-M) \times (N-M)}$ is a (N-M)-by-(N-M) identity matrix, $F^-$ is an inverse discrete Fourier transform matrix, · is a dot product symbol, $H_{0,t}$ is an N-point vector at a t time point, $R_{0,t} = F[x(t-N+1), x(t-N+2), \ldots, x(t)]^T$, $H_{k,t}$ is an N-point vector at a $K^{th}$ t time point, $R_{k,t} = F[r_k(t-N+1), r_k(t-N+2), \ldots, r_k(t)]^T$, t is a time index, N is length of a signal frame, M is an order number, M is within a range from $0.01*f_s$ to $f_s$, and $f_s$ is sampling frequency.

Optionally, when the echo path model in the self-adaptive filter is a frequency-domain model $H_{k,t}$, the echo path model corresponding to each path pre-distorted signal is updated to:

$$H_{k,t+1} = H_{k,t} + \Delta H_{k,t},$$

where $\Delta H_{k,t}$ is the updated item of the coefficient of the self-adaptive filter, $\Delta H_{k,t}$ is an $N^{th}$-order vector, N is a positive integer, and k=1, 2, . . . , K.

Optionally, performing a minimum-value fusion process to the (K+1) path error signals to obtain a residual signal e(t) may include: mapping the (K+1) path error signals to corresponding mapping signals using a reversible space mapping method; calculating metric values of the corresponding mapping signals using a predetermined minimum-value metric function; searching the minimum metric value among the calculated metric values; and mapping the mapping signal which corresponds to the minimum metric value back to a space where the (K+1) path error signals stay, to obtain the residual signal e(t).

In an embodiment of the present disclosure, an apparatus for reducing distortion echo is provided, including: an amplification unit, configured to perform K-path amplification to a downlink reference signal x(t) to obtain K-path preprocessed signals, where K is a positive integer; a pre-distortion processing unit, configured to perform a pre-distortion process to the K-path preprocessed signals, respectively, to obtain K-path pre-distorted signals $r_k(t)$, where k=1, 2, . . . , K; a filtering unit, configured to perform a filtering process to the downlink reference signal x(t) and each of the K-path pre-distorted signals using a self-adaptive filter which corresponds to the downlink reference signal x(t) and the corresponding pre-distorted signal, to obtain (K+1) path filtering signals; a difference calculation unit, configured to calculate differences between a target signal d(t) and each of the (K+1) path filtering signals to obtain (K+1) path error signals; a fusion unit, configured to perform a minimum-value fusion process to the (K+1) path error signals to obtain a residual signal e(t); and an output unit, configured to output the residual signal e(t) as a final self-adaptive echo cancellation.

Optionally, a pre-distortion mapping function used in the pre-distortion process meets the following equation:

$$r_k(t) = f_k(p_k(t)),$$

where $r_k(t)$ is a $k^{th}$-path pre-distorted signal, $p_k(t)$ is a $k^{th}$-path preprocessed signal, $f_k(x) \neq cx$, $f_k(x) \neq c$, c is a constant, and k=1, 2, . . . , K.

Optionally, to control an input range and an output range of the pre-distortion mapping function by normalization, the pre-distortion mapping function meets the following equation:

$$r_k(t) = x_{max} f_k\left(\frac{p_k(t)}{x_{max}}\right)$$

where $x_{max}$ is a maximum amplitude of the downlink reference signal x(t), $-1 \leq f_k(x) \leq 1$, and k=1, 2, . . . , K.

Optionally, when the echo path model in the self-adaptive filter is a time-domain model $h_{k,t}$, the error signal is represented as follows:

$$e_0(t) = d(t) - y_0(t),$$

$$y_0(t) = h_{0,t} \otimes x(t) = \sum_{m=1}^{M} h_{0,t}(m) x(t - M + m),$$

$$e_k(t) = d(t) - y_k(t),$$

$$y_k(t) = h_{k,t} \otimes r_k(t) = \sum_{m=1}^{M} h_{k,t}(m) r_k(t - M + m),$$

where $e_0(t)$ is the error signal corresponding to the downlink reference signal x(t), d(t) is the target signal, $y_0(t)$ is the filtering signal corresponding to the downlink reference signal x(t), $h_{0,t}$ is an $M^{th}$-order Finite Impulse Response (FIR) filter at a t time point, $h_{0,t}=[h_{0,t}(1), h_{0,t}(2), \ldots, h_{0,t}(M)]^T$, $e_k(t)$ is an error signal corresponding to each of the K-path pre-distorted signals $r_k(t)$, $y_k(t)$ is an error signal corresponding to each of the K-path pre-distorted signals $r_k(t)$, $h_{k,t}$ is an $M^{th}$ FIR filter at a $K^{th}$ t time point, $h_{k,t}=[h_{k,t}(1), h_{k,t}(2), \ldots, h_{k,t}(M)]^T$, k=1, 2, ..., K, superscript T is a transposition symbol, $\otimes$ is a convolution symbol, t is a time index, M is an order number and satisfies the echo path model, M is within a range from $0.01*f_s$ to $f_s$, and $f_s$ is sampling frequency.

Optionally, when the echo path model in the self-adaptive filter is a time-domain model $h_{k,t}$, the echo path model corresponding to each path pre-distorted signal is updated to:

$$h_{k,t+1} = h_{k,t} + \Delta h_{k,t},$$

where $\Delta h_k$, is the updated item of the coefficient of the self-adaptive filter, $\Delta h_{k,t}$ is an $M^{th}$-order vector, M is a positive integer, and k=1, 2, ..., K.

Optionally, when the echo path model in the self-adaptive filter is a frequency-domain model $H_{k,t}$, the error signals $e_0(t), e_1(t), \ldots, e_K(t)$ are represented by:

$$e_0(t) = d(t) - y_0(t)$$

$$[y_0(t-(N-M)+1), y_0(t-(N-M)+2), \ldots, y_0(t)]^T = [0_{(N-M)\times M} I_{(N-M)\times(N-M)}] F^- [H_{0,t} \cdot R_{0,t}]$$

$$e_k(t) = d(t) - y_k(t),$$

$$[y_k(t-(N-M)+1), y_k(t-(N-M)+2), \ldots, y_k(t)]^T = [0_{(N-M)\times M} I_{(N-M)\times(N-M)}] F^- [H_{k,t} \cdot R_{k,t}],$$

where $e_0(t)$ is the error signal corresponding to the downlink reference signal x(t), d(t) is the target signal, $y_0(t)$ is the filtering signal corresponding to the downlink reference signal x(t), $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M)\times M}$ is a zero matrix having (N-M) rows and M columns, $I_{(N-M)\times(N-M)}$ is a (N-M)-by-(N-M) identity matrix, $F^-$ is an inverse discrete Fourier transform matrix, · is a dot product symbol, $H_{0,t}$ is an N-point vector at a t time point, $R_{0,t}=F[x(t-N+1), x(t-N+2), \ldots, x(t)]^T$, $H_{k,t}$ is an N-point vector at a $K^{th}$ t time point, $R_{k,t}=F[r_k(t-N+1), r_k(t-N+2), \ldots, r_k(t)]^T$, t is a time index, N is length of a signal frame, M is an order number, M is within a range from $0.01*f_s$ to $f_s$, and $f_s$ is sampling frequency.

Optionally, when the echo path model in the self-adaptive filter is a frequency-domain model $H_{k,t}$, the echo path model corresponding to each path pre-distorted signal is updated to:

$$H_{k,t+1} = H_{k,t} + \Delta H_{k,t},$$

where $\Delta H_{k,t}$ is the updated item of the coefficient of the self-adaptive filter, $\Delta H_{k,t}$ is an $N^{th}$-order vector, N is a positive integer, and k=1, 2, ..., K.

Optionally, the fusion unit may include: a mapping sub-unit, configured to map the (K+1) path error signals to corresponding mapping signals using a reversible space mapping method; a metric value obtaining sub-unit, configured to calculate metric values of the corresponding mapping signals using a predetermined minimum-value metric function; a searching sub-unit, configured to search the minimum metric value among the calculated metric values; and a residual signal obtaining sub-unit, configured to map the mapping signal which corresponds to the minimum metric value back to a space where the (K+1) path error signals stay, to obtain the residual signal e(t).

From above, in embodiments of the present disclosure, a method and apparatus for reducing distortion echo are provided. K-path amplification and pre-distortion process are performed to the downlink reference signal to obtain K-path pre-distorted signals. Afterwards, filtering is performed using the self-adaptive filters which correspond to the downlink reference signal x(t) and the K-path pre-distorted signals to obtain the filtering signals. Error signals are obtained by calculating differences between the target signal and each of the filtering signals. The minimum-value fusion process is performed to the error signals to obtain the residual signal which is then output as the final self-adaptive echo cancellation. In embodiments of the present disclosure, the residual signal is relatively small as the minimum-value fusion process is performed to the error signals. That is to say, echo loss is relatively great. Therefore, the method may provide echo loss with high amplitude under a situation that a speaker has relatively serious distortion.

BRIEF DESCRIPTION OF THE DRAWINGS

In order to clarify solutions of embodiments of the present disclosure or related art, accompanying drawings of the present disclosure or the related art will be described briefly. Obviously, the drawings are just examples and do not limit the scope of the disclosure, and other drawings may be obtained by a person skilled in the art based on these drawings without creative work.

DETAILED DESCRIPTION OF THE DISCLOSURE

Embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

In embodiments of the present disclosure, a method and apparatus for reducing distortion echo are provided, which can steadily provide echo loss with high amplitude under a situation that a speaker has relatively serious distortion.

Figure 2:
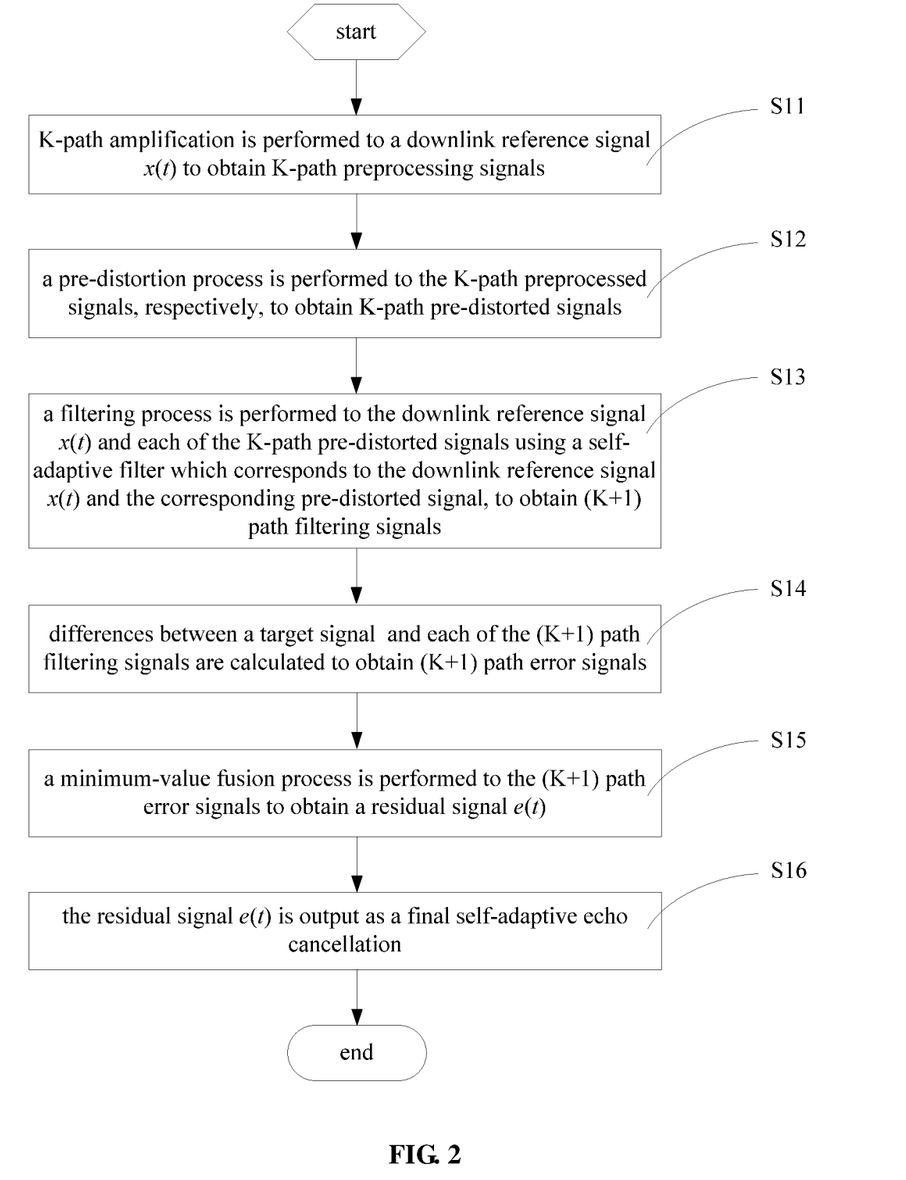
FIG. 2 schematically illustrates a flow chart of a method for reducing distortion echo according to an embodiment of the disclosure.

FIG. 2 schematically illustrates a flow chart of a method for reducing distortion echo according to an embodiment of the disclosure. Referring to FIG. 2, the method may include S11 to S16.

In S11, K-path amplification is performed to a downlink reference signal x(t) to obtain K-path preprocessed signals, where K is a positive integer.

In some embodiments, performing the K-path amplification may include: adjusting amplitude of the downlink reference signal x(t) using gains $g_1, g_2, \ldots, g_k$ to obtain the K-path preprocessed signals $p_1(t), p_2(t), \ldots, p_k(t)$. Equation used in the step is shown as follows:

$$p_1(t) = g_1 x(t),$$
$$p_2(t) = g_2 x(t),$$
$$\vdots$$
$$p_K(t) = g_K x(t),$$

where $0 \leq g_1, g_2, \ldots, g_k \leq 1$.

It should be noted that, the gain is not greater than 1 to avoid the downlink reference signal to generate extra amplitude spillover distortion in a digital system.

In S12, a pre-distortion process is performed to the K-path preprocessed signals, respectively, to obtain K-path pre-distorted signals $r_k(t)$, where $k=1, 2, \ldots, K$.

A pre-distortion mapping function used in the pre-distortion process meets the following equation:

$$r_k(t) = f_k(p_k(t)),$$

where $r_k(t)$ is a $k^{th}$-path pre-distorted signal, $p_k(t)$ is a $k^{th}$-path preprocessed signal, $f_k(x) \neq cx$, $f_k(x) \neq c$, c is a constant, and $k=1, 2, \ldots, K$.

The pre-distortion mapping function aims to generate a pre-distorted signal related to the downlink reference signal x(t) based on the downlink reference signal x(t), to simulate distortion of a speaker.

In S13, a filtering process is performed to the downlink reference signal x(t) and each of the K-path pre-distorted signals using a self-adaptive filter which corresponds to the downlink reference signal x(t) and the corresponding pre-distorted signal, to obtain (K+1) path filtering signals.

In S14, differences between a target signal d(t) and each of the (K+1) path filtering signals are calculated to obtain (K+1) path error signals.

In S15, a minimum-value fusion process is performed to the (K+1) path error signals to obtain a residual signal e(t).

In S16, the residual signal e(t) is output as a final self-adaptive echo cancellation.

From above, in the method for reducing distortion echo, K-path amplification and pre-distortion process are performed to the downlink reference signal to obtain K-path pre-distorted signals. Afterwards, filtering is performed using the self-adaptive filters which correspond to the downlink reference signal x(t) and the K-path pre-distorted signals to obtain the filtering signals. Error signals are obtained by calculating differences between the target signal and each of the filtering signals. The minimum-value fusion process is performed to the error signals to obtain the residual signal which is then output as the final self-adaptive echo cancellation. In embodiments of the present disclosure, the residual signal is relatively small as the minimum-value fusion process is performed to the error signals. That is to say, echo loss is relatively great. Therefore, the method may provide echo loss with high amplitude under a situation that a speaker has relatively serious distortion.

In some embodiments, to facilitate the design and use of the pre-distortion mapping function, an input range and an output range of the pre-distortion mapping function are controlled by normalization and the pre-distortion mapping function may meet the following equation:

$$r_k(t) = x_{max} f_k\left(\frac{p_k(t)}{x_{max}}\right)$$

where $x_{max}$ is a maximum amplitude of the downlink reference signal x(t), $-1 \leq f_k(x) \leq 1$, and $k=1, 2, \ldots, K$.

In some embodiments, the pre-distortion mapping function may be selected from but not limited to the following equations:

$$f_k(x) = |x|^\gamma + c,$$
$$f_k(x) = \text{sign}(x)|x|^\gamma + c,$$
$$f_k(x) = \sin(cx),$$
$$f_k(x) = \tan(cx),$$

or any combination of the above equations, for example, $$f_k(x) = a_1 |x|^{\gamma_1} + a_2 \text{sign}(x) |x|^{\gamma_2} + a_3 \sin(c_3 x) + a_4 \tan(c_4 x) + c.$$

In some embodiments, the pre-distortion mapping function may be a function, for example, $$f_k(x) = \begin{cases} x + c_1 & |x| < x_1 \\ \text{sign}(x)|x|^\gamma + c_2 & x_1 \leq |x| < x_2, \\ c_3 & x_2 \leq |x| \end{cases}$$

where $c, c_1, c_2, c_3, c_4, \gamma, \gamma_1, \gamma_2, a_1, a_2, a_3, a_4, x_1$ and $x_2$ are real constants, and sign(x) is a function that extracts the sign of a real number.

Multi-path pre-distorted mapping function is required for obtaining the pre-distorted signals because of following reasons. The distortion of the speaker is complicated and time-varying. One type of distortion process hardly effectively approximates distortion component in an echo signal. Therefore, in embodiments of the present disclosure, multi-path distortion process is performed to obtain various distortion process results, such that an input of the minimum-value fusion process can be selected from abundant candidates.

In some embodiments, an echo path model in the self-adaptive filter may be a time-domain model or a frequency-domain model. The self-adaptive filter and the error signal which correspond to the downlink reference signal x(t) are described in detail below.

When the echo path model in the self-adaptive filter is a time-domain model $h_{k,t}$, the error signal may be as follows:

$$e_0(t) = d(t) - y_0(t),$$
$$y_0(t) = h_{0,t} \otimes x(t) = \sum_{m=1}^{M} h_{0,t}(m) x(t - M + m),$$
$$e_k(t) = d(t) - y_k(t),$$
$$y_k(t) = h_{k,t} \otimes r_k(t) = \sum_{m=1}^{M} h_{k,t}(m) r_k(t - M + m),$$

where $e_0(t)$ is the error signal corresponding to the downlink reference signal x(t), d(t) is the target signal, $y_0(t)$ is the filtering signal corresponding to the downlink reference signal x(t), $h_{0,t}$ is an $M^{th}$-order Finite Impulse Response (FIR) filter at a t time point, $h_{0,t} = [h_{0,t}(1), h_{0,t}(2), \ldots, h_{0,t}(M)]^T$, $e_k(t)$ is an error signal corresponding to each of the K-path pre-distorted signals $r_k(t)$, $y_k(t)$ is an error signal corresponding to each of the K-path pre-distorted signals $r_k(t)$ $h_{k,t}$ is an $M^{th}$ FIR filter at a $K^{th}$ t time point, $h_{k,t}=[h_{k,t}(1), h_{k,t}(2), \ldots, h_{k,t}(M)]^T$, k=1, 2, ..., K, superscript T is a transposition symbol, $\otimes$ is a convolution symbol, t is a time index, M is an order number and satisfies the echo path model, M is within a range from $0.01*f_s$ to $f_s$, and $f_s$ is sampling frequency.

A self-adaptive filtering algorithm is used to calculate the residual signal e(t) to obtain an update item of a coefficient of the self-adaptive filter. When the echo path model in the self-adaptive filter is a time-domain model $h_{k,t}$, the calculation can be realized by any time-domain self-adaptive filtering algorithm, such as Least Mean Square (LMS), Normalized Least Mean Square (NMLS), Affine Projection (AP), Fast Affine Projection (FAP), Least Square (LS) or Recursive Least Square (RLS).

For example, the NMLS algorithm is used to realize the calculation:

$$\Delta h_{0,t} = \mu_{h,0}[\Delta h_{0,t}(1), \Delta h_{0,t}(2), \ldots, \Delta h_{0,t}(M)]^T$$

$$\Delta h_{0,t}(m) = \frac{e_0(t)x(t-M+m)}{\varepsilon + \sum_{m=1}^{M} x(t-M+m)^2},$$

$$\Delta h_{k,t} = \mu_{h,k}[\Delta h_{k,t}(1), \Delta h_{k,t}(2), \ldots, \Delta h_{k,t}(M)]^T$$

$$\Delta h_{k,t}(m) = \frac{e_k(t)r_k(t-M+m)}{\varepsilon + \sum_{m=1}^{M} r_k(t-M+m)^2},$$

where $\varepsilon$ is a micro positive real number which prevents zero division error, $\mu_{h,0}$ and $\mu_{h,k}$ are update step size, $0<\mu_{h,0}, \mu_{h,k}<2$, k=1, 2, ..., K, and t is a time index.

The echo path model corresponding to each path pre-distorted signal is updated to:

$$h_{k,t+1} = h_{k,t} + \Delta h_{k,t},$$

where $\Delta h_{k,t}$ is the updated item of the coefficient of the self-adaptive filter, $\Delta h_{k,t}$ is an $M^{th}$-order vector, M is a positive integer, and k=1, 2, ..., K.

Calculation is performed to the downlink reference signal x(t) and the K-path pre-distorted signals $r_1(t), \ldots, r_K(t)$ using a self-adaptive filtering algorithm to obtain the error signals $e_0(t), e_1(t), \ldots, e_K(t)$. When the echo path model in the self-adaptive filter is a frequency-domain model $H_{k,t}$, the error signals $e_0(t), e_1(t), \ldots, e_K(t)$ may be represented by:

$$e_0(t) = d(t) - y_0(t)$$

$$[y_0(t-(N-M)+1), y_0(t-(N-M)+2), \ldots y_0(t)]^T = [0_{(N-M) \times M} I_{(N-M) \times (N-M)}] F^-[H_{0,t} \cdot R_{0,t}]$$

$$e_k(t) = d(t) - y_k(t),$$

$$[y_k(t-(N-M)+1), y_k(t-(N-M)+2), \ldots y_k(t)]^T = [0_{(N-M) \times M} I_{(N-M) \times (N-M)}] F^-[H_{k,t} \cdot R_{k,t}],$$

where $e_0(t)$ is the error signal corresponding to the downlink reference signal x(t), d(t) is the target signal, $y_0(t)$ is the filtering signal corresponding to the downlink reference signal x(t), $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M) \times M}$ is a zero matrix having (N-M) rows and M columns, $I_{(N-M) \times (N-M)}$ is a (N-M)-by-(N-M) identity matrix, $F^-$ is an inverse discrete Fourier transform matrix, · is a dot product symbol, $H_{0,t}$ is an N-point vector at a t time point, $R_{0,t}=F[x(t-N+1), x(t-N+2), \ldots, x(t)]^T$, $H_{k,t}$ is an N-point vector at a $K^{th}$ t time point, $R_{k,t}=F[r_k(t-N+1), r_k(t-N+2), \ldots, r_k(t)]^T$, t is a time index, N is length of a signal frame, M is an order number, M is within a range from $0.01*f_s$ to $f_s$, $f_s$ is sampling frequency, F is a discrete Fourier transform matrix, k=1, 2, ..., K, and K is a positive integer.

A self-adaptive filtering algorithm is used to calculate the residual signal e(t) to obtain an update item of a coefficient of the self-adaptive filter. When the echo path model in the self-adaptive filter is a frequency-domain model $H_{k,t}$, the calculation can be realized by any frequency-domain self-adaptive filtering algorithm, such as Frequency Domain Adaptive Filter (FDAF), Multi-Delay Adaptive Filter (MDAF), Windowing Frequency Domain Adaptive Filter (WDAF).

For example, the FDAF algorithm is used to realize the calculation:

$$\Delta H_{0,t} = \mu_{H,0} \frac{R_{0,t}^* E_{0,t}}{\varepsilon + E[|R_{0,t}|^2]},$$

$$\Delta H_{k,t} = \mu_{H,k} \frac{R_{k,t}^* E_{k,t}}{\varepsilon + E[|R_{k,t}|^2]},$$

where $\varepsilon$ is a micro positive real number which prevents zero division error, * is a conjugation symbol, $\mu_{H,0}$ and $\mu_{H,k}$ are update step size, $0<\mu_{H,0}, \mu_{H,k}<2$, k=1, 2, ..., K.

$$E_{0,t} = F[e_0(t-N+1), e_0(t-N+2), \ldots, e_0(t)]^T,$$

$$R_{0,t} = F[x(t-N+1), x(t-N+2), \ldots, x(t)]^T,$$

$$E_{k,t} = F[e_k(t-N+1), e_k(t-N+2), \ldots, e_k(t)]^T,$$

$$R_{k,t} = F[r_k(t-N+1), r_k(t-N+2), \ldots, r_k(t)]^T,$$

$E[|R_{0,t}|^2]$ is the expectation value of energy spectrum of $R_{0,t}$, which is obtained by an autoregressive method as follows:

$$E[|R_{0,t}|^2] = \eta E[|R_{0,t-1}|^2] + (1-\eta)|R_{0,t}|^2, \text{ and}$$

$E[|R_{k,t}|^2]$ is the expectation value of energy spectrum of $R_{k,t}$, which is obtained by an autoregressive method as follows:

$$E[|R_{k,t}|^2] = \eta E[|R_{k,t-1}|^2] + (1-\eta)|R_{k,t}|^2,$$

where $\eta$ is an update factor, $0<\eta<1$, k=1, 2, ..., K.

The echo path model is updated to:

$$H_{k,t+1} = H_{k,t} + \Delta H_{k,t},$$

where $\Delta H_{k,t}$ is the updated item of the coefficient of the self-adaptive filter, $\Delta H_{k,t}$ is an $N^{th}$-order vector, N is a positive integer, and k=1, 2, ..., K.

Figure 3:
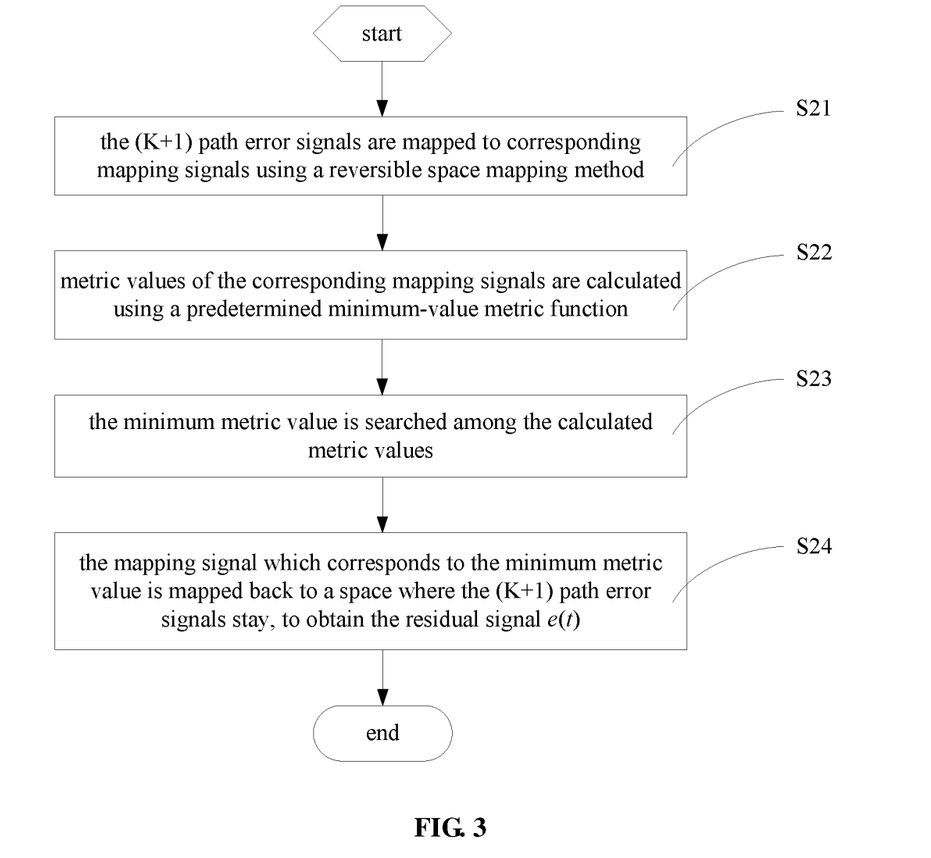
FIG. 3 schematically illustrates a flow chart of a method for performing a minimum-value fusion process to (K+1)$^{th}$ path error signals to obtain a residual signal according to an embodiment of the disclosure.

FIG. 3 schematically illustrates a flow chart of a method for performing a minimum-value fusion process to $(K+1)^{th}$ path error signals to obtain a residual signal according to an embodiment of the disclosure. S15 may include S21 to S24.

In S21, the (K+1) path error signals are mapped to corresponding mapping signals using a reversible space mapping method.

In S22, metric values of the corresponding mapping signals are calculated using a predetermined minimum-value metric function.

In S23, the minimum metric value is searched among the calculated metric values.

In S24, the mapping signal which corresponds to the minimum metric value is mapped back to a space where the (K+1) path error signals stay, to obtain the residual signal e(t).

As parameters of the self-adaptive filter are different, residual signals corresponding to the (K+1) path error signals $e_0(t)$, $e_1(t)$, ..., $e_K(t)$ may be least at different time points or in different spaces. In the minimum-value fusion process, the (K+1) path error signals $e_0(t)$, $e_1(t)$, ..., $e_K(t)$ are mapped to the mapping signal $S_{0,t}$, $S_{1,t}$, ..., $S_{K,t}$ using a space mapping method. The metric values $v_0$, $v_1$, ..., $v_K$ of the corresponding mapping signals $S_{0,t}$, $S_{1,t}$, ..., $S_{K,t}$ are calculated using the predetermined minimum-value metric function, and the minimum metric value $v_{k_{min}}$ is searched among the calculated metric values. The $(k_{min})^{th}$ mapping signal $S_{k_{min},t}$ corresponding to the minimum metric value $v_{k_{min}}$ is mapped back to an original space (i.e., the space where the (K+1) path error signals stay) to obtain the residual signal e(t). Afterward, the residual signal e(t) is output as the final self-adaptive echo cancellation.

In some embodiments, the minimum-value fusion process may be relatively simple. In some embodiments, the space mapping is framing of short-time signals, such as $$S_{k,t}[e_k(t-L+1), e_k(t-L+2), \ldots, e_k(t)],$$

where $S_{k,t}$ is the mapping signal, t is a time index, and k=1, 2, ..., K.

In some embodiments, the minimum-value metric function aims to calculate a short-time amplitude, such as $$v_k = f_{min}(S_{k,t}) = \sum_{l=1}^{L} |e_k(t-L+l)|,$$

where $v_k$ is the minimum metric value, t is a time index, and k=1, 2, ..., K.

In some embodiments, the minimum-value metric function aims to calculate short-time power, such as $$v_k = f_{min}(S_{k,t}) = \sum_{l=1}^{L} e_k(t-L+l)^2,$$

where $v_k$ is the minimum metric value, t is a time index, and k=1, 2, ..., K.

In the above equations, L is a positive integer which represents a short-time section and is within a range from $0.001 \ast f_s$ to $f_s$, and $f_s$ is sampling frequency.

When the mapping signal $S_{k_{min},t}$ whose short-time amplitude or short-time power is) the smallest is selected, the corresponding expression $[e_{k_{min}}(t-L+1), \ldots, e_{k_{min}}(t)]$ can serve as the final residual signal $[e(t-L+1), \ldots, e(t)]$.

In some embodiments, adjacent short-time sections in one path may be overlapped partially, to facilitate performing a smoothing process to two ends of the sections.

In some embodiments, a relatively effective minimum-value fusion process may be a frequency-domain transformation as follows:

$$S_{k,t}=T_F([e_k(t-L+1), \ldots, e_k(t)]),$$

where $S_{k,t}$ is the mapping signal, $T_F$ represents the frequency-domain transformation, L is a positive integer which represents a short-time section and is within a range from $0.001 \ast f_s$ to $f_s$, $f_s$ is sampling frequency, and k=1, 2, ..., K.

The frequency-domain transformation $T_F$ may be Discrete Fourier Transform (DFT), Discrete Cosine Transform (DCT), Karhunen-Loeve (KL), Modified Discrete Cosine Transform (MDCT), etc. The frequency-domain transformation $T_F$ is reversible, and its reversible transformation is $T_F^-$.

The mapping signal $S_{k,t}$ obtained by the frequency-domain transformation is a $L_F$-point vector. To different mapping, $L_F$ may be different. For example, to DFT, DCT or KL transformation, $L_F=L$, while to MDCT transformation, $L_F=L/2$. The minimum-value metric function may be modulus of the mapping signal $S_{k,t}[l]$, l=1, 2, ..., $L_F$: $f_{min}(x)=|x|$, or may be weight of absolute values of real part and virtual part of the modulus $f_{min}(x)=\lambda_{real}|real(x)|^{\gamma_{real}}+\lambda_{imag}|imag(x)|^{\gamma_{imag}}$, where $\lambda_{real}$ and $\lambda_{imag}$ are weight coefficients and non-negative real numbers, $\gamma_{real}$ and $\gamma_{imag}$ are order coefficients and non-negative real numbers.

The metric values of the mapping signals $S_{k,t}[l]$, l=1, 2, $L_F$ are obtained using the minimum-value metric function based on the following equation:

$$v_{k,l}=f_{min}(S_{k,t}[l]),$$

where $v_{k,l}$ is the minimum metric value, integer index l=1, 2, ..., $L_F$, and k=1, 2, ..., K.

The mapping signals $S_{k,t}[l]$, l=1, 2, ..., $L_F$ are fused to fused signals $S_t[l]=S_{k_l,t}[l]$ based on the metric values, where $k_l$ satisfies the following equation:

$$f_{min}(S_{k_l,t}[l])=\min([v_{0,l}, v_{1,l}, \ldots, v_{K,l}]).$$

Afterward, the fused signals $S_t[l]=S_{k_l,t}[l]$ are inversely mapped to obtain the final residual signal $[e(t-L+1), \ldots, e(t)]$ using reversible frequency-domain transformation $T_F^-$ as follows:

$$[e(t-L+1), \ldots, e(t)]=T_F^-(S_t).$$

In some embodiments, adjacent short-time sections in one path may be overlapped partially, to facilitate performing a smoothing process to two ends of the sections.

In above embodiments, K is a positive integer.

Below test is performed to ensure that echo loss with high amplitude can be steadily provided under a situation that a speaker has relatively serious distortion.

Two path pre-distorted signals are selected to be processed, each path having a gain of 1, and the pre-distortion mapping functions are:

$$f_1(x)=\text{sign}(x)|x|^{0.1}, \text{ and}$$

$$f_2(x)=\text{sign}(x)|x|^{0.2}.$$

DCT mapping is used as the space mapping in the minimum-value fusion process. The short-time section L=160, the minimum-value metric function is calculating an absolute value, and the self-adaptive filter uses FDAF. Compared a processing result in the embodiment with a result obtained by an existing method, a processed signal obtained in the embodiment is evidently smaller than a processed signal obtained in an existing Acoustic echo cancellation (AEC) method, and amplitude of echo loss is increased by at least 5 dB.

Figure 4:
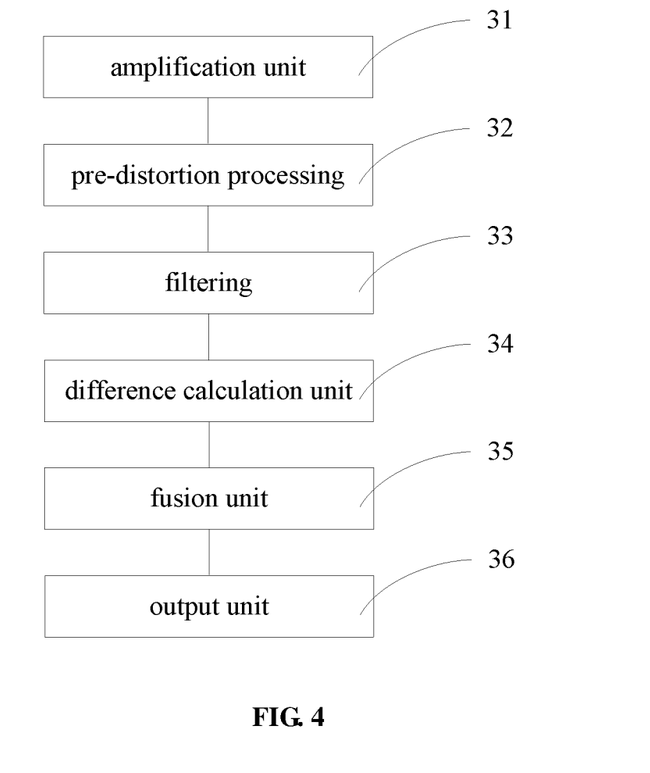
FIG. 4 schematically illustrates a structural diagram of an apparatus for reducing distortion echo according to an embodiment of the disclosure.

Accordingly, in an embodiment, an apparatus for reducing distortion echo is provided. FIG. 4 schematically illustrates a structural diagram of the apparatus for reducing distortion echo. Referring to FIG. 4, the apparatus includes an amplification unit 31, a pre-distortion processing unit 32, a filtering unit 33, a difference calculation unit 34, a fusion unit 35 and an output unit 36.

The amplification unit 31 is configured to perform K-path amplification to a downlink reference signal x(t) to obtain K-path preprocessed signals, where K is a positive integer.

In some embodiments, performing the K-path amplification may include: adjusting amplitude of the downlink reference signal x(t) using gains $g_1, g_2, \ldots, g_k$ to obtain the K-path preprocessed signals $p_1(t), p_2(t), \ldots, p_k(t)$. Equation used in the step is shown as follows:

$$p_1(t) = g_1 x(t),$$
$$p_2(t) = g_2 x(t),$$
$$\vdots$$
$$p_K(t) = g_K x(t),$$

where $0 \leq g_1, g_2, \ldots, g_k \leq 1$.

It should be noted that, the gain is not greater than 1 to avoid the downlink reference signal to generate extra amplitude spillover distortion in a digital system.

The pre-distortion processing unit 32 is configured to perform a pre-distortion process to the K-path preprocessed signals, respectively, to obtain K-path pre-distorted signals $r_k(t)$, where $k=1, 2, \ldots, K$.

A pre-distortion mapping function used in the pre-distortion process meets the following equation:

$$r_k(t) = f_k(p_k(t)),$$

where $r_k(t)$ is a $k^{th}$-path pre-distorted signal, $p_k(t)$ is a $k^{th}$-path preprocessed signal, $f_k(x) \neq cx$, $f_k(x) \neq c$, c is a constant, and $k=1, 2, \ldots, K$.

The pre-distortion mapping function aims to generate a pre-distorted signal related to the downlink reference signal x(t) based on the downlink reference signal x(t), to simulate distortion of a speaker.

The filtering unit 33 is configured to perform a filtering process to the downlink reference signal x(t) and each of the K-path pre-distorted signals using a self-adaptive filter which corresponds to the downlink reference signal x(t) and the corresponding pre-distorted signal, to obtain (K+1) path filtering signals.

The difference calculation unit 34 is configured to calculate differences between a target signal d(t) and each of the (K+1) path filtering signals to obtain (K+1) path error signals.

The fusion unit 35 is configured to perform a minimum-value fusion process to the (K+1) path error signals to obtain a residual signal e(t).

The output unit 36 is configured to output the residual signal e(t) as a final self-adaptive echo cancellation.

From above, by the apparatus for reducing distortion echo, K-path amplification and pre-distortion process are performed to the downlink reference signal to obtain K-path pre-distorted signals. Afterwards, filtering is performed using the self-adaptive filters which correspond to the downlink reference signal x(t) and the K-path pre-distorted signals to obtain the filtering signals. Error signals are obtained by calculating differences between the target signal and each of the filtering signals. The minimum-value fusion process is performed to the error signals to obtain the residual signal which is then output as the final self-adaptive echo cancellation. In embodiments of the present disclosure, the residual signal is relatively small as the minimum-value fusion process is performed to the error signals. That is to say, echo loss is relatively great. Therefore, the apparatus may provide echo loss with high amplitude under a situation that a speaker has relatively serious distortion.

In some embodiments, to facilitate the design and use of the pre-distortion mapping function, an input range and an output range of the pre-distortion mapping function are controlled by normalization and the pre-distortion mapping function may meet the following equation:

$$r_k(t) = x_{max} f_k\left(\frac{p_k(t)}{x_{max}}\right)$$

where $x_{max}$ is a maximum amplitude of the downlink reference signal x(t), $-1 \leq f_k(x) \leq 1$, and $k=1, 2, \ldots, K$.

In some embodiments, the pre-distortion mapping function may be selected from but not limited to the following equations:

$$f_k(x) = |x|^\gamma + c,$$
$$f_k(x) = \text{sign}(x)|x|^\gamma + c,$$
$$f_k(x) = \sin(cx),$$
$$f_k(x) = \tan(cx),$$

or any combination of the above equations, for example, $$f_k(x) = a_1|x|^{\gamma_1} + a_2 \text{sign}(x)|x|^{\gamma_2} + a_3 \sin(c_3 x) + a_4 \tan(c_4 x) + c.$$

In some embodiments, the pre-distortion mapping function may be a function, for example, $$f_k(x) = \begin{cases} x + c_1 & |x| < x_1 \\ \text{sign}(x)|x|^\gamma + c_2 & x_1 \leq |x| < x_2 \\ c_3 & x_2 \leq |x| \end{cases},$$

where $c, c_1, c_2, c_3, c_4, \gamma, \gamma_1, \gamma_2, a_1, a_2, a_3, a_4, x_1$ and $x_2$ are real constants, and sign(x) is a function that extracts the sign of a real number.

Multi-path pre-distorted mapping function is required for obtaining the pre-distorted signals because of following reasons. The distortion of the speaker is complicated and time-varying. One type of distortion process hardly effectively approximates distortion component in an echo signal. Therefore, in embodiments of the present disclosure, multi-path distortion process is performed to obtain various distortion process results, such that an input of the minimum-value fusion process can be selected from abundant candidates.

In some embodiments, an echo path model in the self-adaptive filter may be a time-domain model or a frequency-domain model. The self-adaptive filter and the error signal which correspond to the downlink reference signal x(t) are described in detail below.

When the echo path model in the self-adaptive filter is a time-domain model $h_{k,t}$, the error signal may be as follows:

$$e_0(t) = d(t) - y_0(t),$$
$$y_0(t) = h_{0,t} \otimes x(t) = \sum_{m=1}^{M} h_{0,t}(m) x(t - M + m),$$
$$e_k(t) = d(t) - y_k(t),$$
$$y_k(t) = h_{k,t} \otimes r_k(t) = \sum_{m=1}^{M} h_{k,t}(m) r_k(t - M + m),$$

where $e_0(t)$ is the error signal corresponding to the downlink reference signal x(t), d(t) is the target signal, $y_0(t)$ is the filtering signal corresponding to the downlink reference signal x(t), $h_{0,t}$ is an $M^{th}$-order Finite Impulse Response (FIR) filter at a t time point, $h_{0,t}=[h_{0,t}(1), h_{0,t}(2), \ldots, h_{0,t}(M)]^T$, $e_k(t)$ is an error signal corresponding to each of the K-path pre-distorted signals $r_k(t)$, $y_k(t)$ is an error signal corresponding to each of the K-path pre-distorted signals $r_k(t)$, $h_{k,t}$ is an $M^{th}$ FIR filter at a $K^{th}$ t time point, $h_{k,t}=[h_{k,t}(1), h_{k,t}(2), \ldots, h_{k,t}(M)]^T$, k=1, 2, ..., K, superscript T is a transposition symbol, ⊗ is a convolution symbol, t is a time index, M is an order number and satisfies the echo path model, M is within a range from 0.01*$f_s$ to $f_s$, and $f_s$ is sampling frequency.

A self-adaptive filtering algorithm is used to calculate the residual signal e(t) to obtain an update item of a coefficient of the self-adaptive filter. When the echo path model in the self-adaptive filter is a time-domain model $h_{k,t}$, the calculation can be realized by any time-domain self-adaptive filtering algorithm, such as LMS, NMLS, AP, FAP, LS or RLS.

The echo path model corresponding to each path pre-distorted signal is updated to:

$$h_{k,t+1} = h_{k,t} + \Delta h_{k,t},$$

where $\Delta h_{k,t}$ is the updated item of the coefficient of the self-adaptive filter, $\Delta h_{k,t}$ is an $M^{th}$-order vector, M is a positive integer, and k=1, 2, ..., K.

Calculation is performed to the downlink reference signal x(t) and the K-path pre-distorted signals $r_1(t), \ldots, r_K(t)$ using a self-adaptive filtering algorithm to obtain the error signals $e_0(t), e_1(t), \ldots, e_K(t)$. When the echo path model in the self-adaptive filter is a frequency-domain model $H_{k,t}$, the error signals $e_0(t), e_1(t), \ldots, e_K(t)$ may be represented by:

$$e_0(t) = d(t) - y_0(t)$$

$$[y_0(t-(N-M)+1), y_0(t-(N-M)+2), \ldots, y_0(t)]^T = [0_{(N-M) \times M} I_{(N-M) \times (N-M)}] F^-[H_{0,t} \cdot R_{0,t}]$$

$$e_k(t) = d(t) - y_k(t),$$

$$[y_k(t-(N-M)+1), y_k(t-(N-M)+2), \ldots, y_k(t)]^T = [0_{(N-M) \times M} I_{(N-M) \times (N-M)}] F^-[H_{k,t} \cdot R_{k,t}],$$

where $e_0(t)$ is the error signal corresponding to the downlink reference signal x(t), d(t) is the target signal, $y_0(t)$ is the filtering signal corresponding to the downlink reference signal x(t), $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M) \times M}$ is a zero matrix having (N-M) rows and M columns, $I_{(N-M) \times (N-M)}$ is a (N-M)-by-(N-M) identity matrix, $F^-$ is an inverse discrete Fourier transform matrix, · is a dot product symbol, $H_{0,t}$ is an N-point vector at a t time point, $R_{0,t}=F[x(t-N+1), x(t-N+2), \ldots, x(t)]^T$, $H_{k,t}$ is an N-point vector at a $K^{th}$ t time point, $R_{k,t}=F[r_k(t-N+1), r_k(t-N+2), \ldots, r_k(t)]^T$, t is a time index, N is length of a signal frame, M is an order number, M is within a range from 0.01*$f_s$ to $f_s$, $f_s$ is sampling frequency, F is a discrete Fourier transform matrix, k=1, 2, ..., K, and K is a positive integer.

A self-adaptive filtering algorithm is used to calculate the residual signal e(t) to obtain an update item of a coefficient of the self-adaptive filter. When the echo path model in the self-adaptive filter is a frequency-domain model $H_{k,t}$, the calculation can be realized by any frequency-domain self-adaptive filtering algorithm, such as FDAF, MDAF or WDAF.

The echo path model is updated to:

$$H_{k,t+1} = H_{k,t} + \Delta H_{k,t},$$

where $\Delta H_{k,t}$ is the updated item of the coefficient of the self-adaptive filter, $\Delta H_{k,t}$ is an $N^{th}$-order vector, N is a positive integer, and k=1, 2, ..., K.

Figure 5:
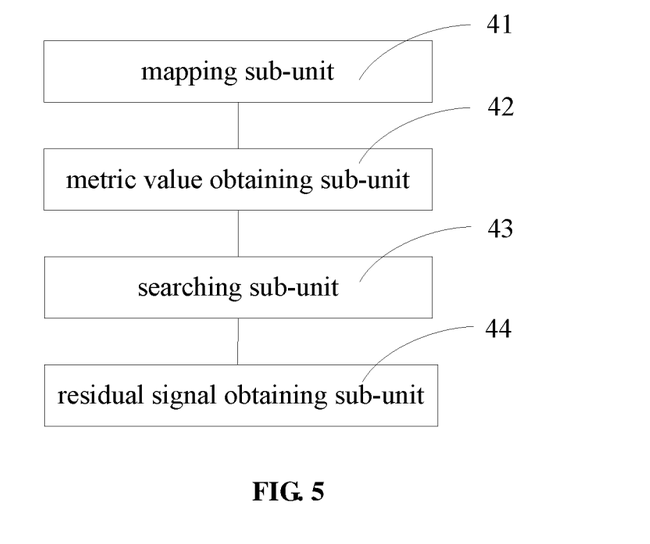
FIG. 5 schematically illustrates a structural diagram of a fusion unit.

FIG. 5 schematically illustrates a structural diagram of a fusion unit. The fusion unit includes include a mapping sub-unit 41, a metric value obtaining sub-unit 42, a searching sub-unit 43 and a residual signal obtaining sub-unit 44.

The mapping sub-unit 41 is configured to map the (K+1) path error signals to corresponding mapping signals using a reversible space mapping method.

The metric value obtaining sub-unit 42 is configured to calculate metric values of the corresponding mapping signals using a predetermined minimum-value metric function.

The searching sub-unit 43 is configured to search the minimum metric value among the calculated metric values.

The residual signal obtaining sub-unit 44 is configured to map the mapping signal which corresponds to the minimum metric value back to a space where the (K+1) path error signals stay, to obtain the residual signal e(t).

As parameters of the self-adaptive filter are different, residual signals corresponding to the (K+1) path error signals $e_0(t), e_1(t), \ldots, e_K(t)$ may be least at different time points or in different spaces. In the minimum-value fusion process, the (K+1) path error signals $e_0(t), e_1(t), \ldots, e_K(t)$ are mapped to the mapping signal $S_{0,t}, S_{1,t}, \ldots, S_{K,t}$ using a space mapping method. The metric values $v_0, v_1, \ldots, v_K$ of the corresponding mapping signals $S_{0,t}, S_{1,t}, \ldots, S_{K,t}$ are calculated using the predetermined minimum-value metric function, and the minimum metric value $v_{k_{min}}$ is searched among the calculated metric values. The $(k_{min})^{th}$ mapping signal $S_{k_{min},t}$ corresponding to the minimum metric value $v_{k_{min}}$ is mapped back to an original space (i.e., the space where the (K+1) path error signals stay) to obtain the residual signal e(t). Afterward, the residual signal e(t) is output as the final self-adaptive echo cancellation.

In some embodiments, the minimum-value fusion process may be relatively simple. In some embodiments, the space mapping is framing of short-time signals, such as $$S_{k,t} = [e_k(t-L+1), e_k(t-L+2), \ldots, e_k(t)],$$

where $S_{k,t}$ is the mapping signal, t is a time index, and k=1, 2, ..., K.

In some embodiments, the minimum-value metric function aims to calculate a short-time amplitude, such as $$v_k = f_{min}(S_{k,t}) = \sum_{l=1}^{L} |e_k(t-L+l)|,$$

where $v_k$ is the minimum metric value, t is a time index, and k=1, 2, ..., K.

In some embodiments, the minimum-value metric function aims to calculate short-time power, such as $$v_k = f_{min}(S_{k,t}) = \sum_{l=1}^{L} e_k(t-L+l)^2,$$

where $v_k$ is the minimum metric value, t is a time index, and k=1, 2, ..., K.

In the above equations, L is a positive integer which represents a short-time section and is within a range from $0.001*f_s$ to $f_s$, and $f_s$ is sampling frequency.

When the mapping signal $S_{k_{min},t}$ whose short-time amplitude or short-time power is the smallest is selected, the corresponding expression $[e_{k_{min}}(t-L+1), \ldots, e_{k_{min}}(t)]$ can serve as the final residual signal $[e(t-L+1), \ldots, e(t)]$.

In some embodiments, adjacent short-time sections in one path may be overlapped partially, to facilitate performing a smoothing process to two ends of the sections.

In some embodiments, a relatively effective minimum-value fusion process may be a frequency-domain transformation as follows:

$$S_{k,t} = T_F([e_k(t-L+1), \ldots, e_k(t)]),$$

where $S_{k,t}$ is the mapping signal, $T_F$ represents the frequency-domain transformation, L is a positive integer which represents a short-time section and is within a range from $0.001*f_s$ to $f_s$, $f_s$ is sampling frequency, and $k=1, 2, \ldots, K$.

The frequency-domain transformation $T_F$ may be Discrete Fourier Transform (DFT), Discrete Cosine Transform (DCT), Karhunen-Loeve (KL), Modified Discrete Cosine Transform (MDCT), etc. The frequency-domain transformation $T_F$ is reversible, and its reversible transformation is $T_F^-$.

The mapping signal $S_{k,t}$ obtained by the frequency-domain transformation is a $L_F$-point vector. To different mapping, $L_F$ may be different. For example, to DFT, DCT or KL transformation, $L_F=L$, while to MDCT transformation, $L_F=L/2$. The minimum-value metric function may be modulus of the mapping signal $S_{k,t}[l]$, $l=1, 2, \ldots, L_F$: $f_{min}(x)=|x|$, or may be weight of absolute values of real part and virtual part of the modulus $f_{min}(x)=\lambda_{real}|real(x)|^{\gamma_{real}}+\lambda_{imag}|imag(x)|^{\gamma_{imag}}$, where $\lambda_{real}$ and $\lambda_{imag}$ are weight coefficients and non-negative real numbers, $\gamma_{real}$ and $\gamma_{imag}$ are order coefficients and non-negative real numbers.

The metric values of the mapping signals $S_{k,t}[l]$, $l=1, 2, \ldots, L_F$ are obtained using the minimum-value metric function based on the following equation:

$$v_{k,l} = f_{min}(S_{k,t}[l]),$$

where $v_{k,l}$ is the minimum metric value, integer index $l=1, 2, \ldots, L_F$, and $k=1, 2, \ldots, K$.

The mapping signals $S_{k,t}[l]$, $l=1, 2, \ldots, L_F$ are fused to fused signals $S_t[l]=S_{k_l,t}[l]$ based on the metric values, where $k_l$ satisfies the following equation:

$$f_{min}(S_{k_l,t}[l]) = \min([v_{0,l}, v_{1,l}, \ldots, v_{K,l}]).$$

Afterward, the fused signals $S_t[l]=S_{k_l,t}[l]$ are inversely mapped to obtain the final residual signal $[e(t-L+1), \ldots, e(t)]$ using reversible frequency-domain transformation $T_F^-$ as follows:

$$[e(t-L+1), \ldots, e(t)] = T_F^-(S_t).$$

In some embodiments, adjacent short-time sections in one path may be overlapped partially, to facilitate performing a smoothing process to two ends of the sections.

In above embodiments, K is a positive integer.

Detailed working principles of components of the apparatus can be referred to corresponding part in the method described in the above-mentioned embodiments.

In the present disclosure, the various embodiments are described in a progressive way. The focus of each embodiment is different from that of other embodiments. And the same or the similar parts between the respective embodiments can refer to each other.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for reducing distortion echo, comprising:
performing K-path amplification to a downlink reference signal x(t) to obtain K-path preprocessed signals, where K is a positive integer;
performing a pre-distortion process to the K-path preprocessed signals, respectively, to obtain K-path pre-distorted signals $r_k(t)$, where $k=1, 2, \ldots, K$;
performing a filtering process to the downlink reference signal x(t) and each of the K-path pre-distorted signals using a self-adaptive filter which corresponds to the downlink reference signal x(t) and the corresponding pre-distorted signal, to obtain (K+1) path filtering signals;
calculating differences between a target signal d(t) and each of the (K+1) path filtering signals to obtain (K+1) path error signals;
performing a minimum-value fusion process to the (K+1) path error signals to obtain a residual signal e(t); and
outputting the residual signal e(t) as a final self-adaptive echo cancellation.

2. The method according to claim 1, wherein a pre-distortion mapping function used in the pre-distortion process meets the following equation:

$$r_k(t) = f_k(p_k(t)),$$

where
$r_k(t)$ is a $k^{th}$-path pre-distorted signal, $p_k(t)$ is a $k^{th}$-path preprocessed signal, $f_k(x) \neq cx$, $f_k(x) \neq c$, $x = p_k(t)$, c is a constant, and $k=1, 2, \ldots, K$.

3. The method according to claim 2, wherein to control an input range and an output range of the pre-distortion mapping function by normalization, the pre-distortion mapping function meets the following equation:

$$r_k(t) = x_{max} f_k\left(\frac{p_k(t)}{x_{max}}\right)$$

where $x_{max}$ is a maximum amplitude of the downlink reference signal x(t), $-1 \leq f_k(x) \leq 1$, $x=p_k(t)/x_{max}$, and $k=1, 2, \ldots, K$.

4. The method according to claim 1, wherein when an echo path model in the self-adaptive filter is a time-domain model $h_{k,t}$, the (K+1) path error signals are represented as follows:

$$e_0(t) = d(t) - y_0(t),$$

$$y_0(t) = h_{0,t} \otimes x(t) = \sum_{m=1}^{M} h_{0,t}(m)x(t - M + m),$$

$$e_k(t) = d(t) - y_k(t),$$

$$y_k(t) = h_{k,t} \otimes r_k(t) = \sum_{m=1}^{M} h_{k,t}(m)r_k(t - M + m),$$

where $e_0(t)$ is the error signal corresponding to the downlink reference signal x(t), d(t) is the target signal, $y_0(t)$ is the filtering signal corresponding to the downlink reference signal x(t), $h_{0,t}$ is an $M^{th}$-order Finite Impulse Response (FIR) filter at a t time point, $h_{0,t}=[h_{0,t}(1), h_{0,t}(2), \ldots, h_{0,t}(M)]^T$, $h_{0,t}$ are coefficients of the FIR filter $h_{0,t}$, $e_k(t)$ is an error signal corresponding to each of the K-path pre-distorted signals $r_k(t)$, $y_k(t)$ is an error signal corresponding to each of the K-path pre-distorted signals $r_k(t)$, $h_{k,t}$ is an $M^{th}$ FIR filter at a $K^{th}$ t time point, $h_{k,t}=[h_{k,t}(1), h_{k,t}(2), \ldots, h_{k,t}(M)]^T$, k=1, 2, \ldots, K, $h_{k,t}$ are coefficients of the FIR filter $h_{k,t}$, superscript T is a transposition symbol, $\otimes$ is a convolution symbol, t is a time index, M is an order number and satisfies the echo path model, M is within a range from $0.01*f_s$ to $f_s$, and $f_s$ is sampling frequency.

5. The method according to claim 4, wherein the echo path model corresponding to each path pre-distorted signal is updated to:

$$h_{k,t+1}=h_{k,t}+\Delta h_{k,t},$$

where $\Delta h_{k,t}$, as an $M^{th}$-order vector, is the updated item of the coefficient of the self-adaptive filter, $h_{k,t+1}$ is an $M^{th}$-order FIR filter at a $K^{th}$ (t+1) time point, M is a positive integer, and k=1, 2, \ldots, K.

6. The method according to claim 1, wherein when an echo path model in the self-adaptive filter is a frequency-domain model $H_{k,t}$, the (K+1) path error signals $e_0(t)$, $e_1(t)$, \ldots, $e_K(t)$ are represented by:

$$e_0(t)=d(t)-y_0(t)$$

$$[y_0(t-(N-M)+1), y_0(t-(N-M)+2), \ldots \ldots y_0(t)]^T = [0_{(N-M)\times M} I_{(N-M)\times(N-M)}] F^-[H_{0,t} \cdot R_{0,t}]$$

$$[y_k(t-(N-M)+1), y_k(t-(N-M)+2), \ldots \ldots y_k(t)]^T = [0_{(N-M)\times M} I_{(N-M)\times(N-M)}] F^-[H_{k,t} \cdot R_{k,t}],$$

where $e_0(t)$ is the error signal corresponding to the downlink reference signal x(t), d(t) is the target signal, $y_0(t)$ is the filtering signal corresponding to the downlink reference signal x(t), $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M)\times M}$ is a zero matrix having (N–M) rows and M columns, $I_{(N-M)\times(N-M)}$ is a (N–M)-by-(N–M) identity matrix, $F^-$ is an inverse discrete Fourier transform matrix, · is a dot product symbol, $H_{0,t}$ is an N-point vector at a t time point, $R_{0,t}=F[x(t-N+1), x(t-N+2), \ldots, x(t)]^T$, $H_{k,t}$ is an N-point vector at a $K^{th}$ t time point, $R_{k,t}=F[r_k(t-N+1), r_k(t-N+2), \ldots, r_k(t)]^T$, t is a time index, N is length of a signal frame, M is an order number, M is within a range from $0.01*f_s$ to $f_s$, and $f_s$ is sampling frequency.

7. The method according to claim 6, wherein the echo path model corresponding to each path pre-distorted signal is updated to:

$$H_{k,t+1}=H_{k,t}+\Delta H_{k,t},$$

where $\Delta H_{k,t}$, s an $N^{th}$-order vector, is the updated item of the coefficient of the self-adaptive filter, $H_{k,t+1}$ is an N-point vector at a $K^{th}$ (t+1) time point, N is a positive integer, and k=1, 2, \ldots, K.

8. The method according to claim 1, wherein performing a minimum-value fusion process to the (K+1) path error signals to obtain a residual signal e(t) comprises:
mapping the (K+1) path error signals to corresponding mapping signals using a reversible space mapping method;
calculating metric values of the corresponding mapping signals using a predetermined minimum-value metric function;
searching a minimum metric value among the calculated metric values; and
mapping the mapping signal which corresponds to the minimum metric value back to a space where the (K+1) path error signals stay, to obtain the residual signal e(t).

9. An apparatus for reducing distortion echo, comprising:
an amplification unit, configured to perform K-path amplification to a downlink reference signal x(t) to obtain K-path preprocessed signals, where K is a positive integer;
a pre-distortion processing unit, configured to perform a pre-distortion process to the K-path preprocessed signals, respectively, to obtain K-path pre-distorted signals $r_k(t)$, where k=1, 2, \ldots, K;
a filtering unit, configured to perform a filtering process to the downlink reference signal x(t) and each of the K-path pre-distorted signals using a self-adaptive filter which corresponds to the downlink reference signal x(t) and the corresponding pre-distorted signal, to obtain (K+1) path filtering signals;
a difference calculation unit, configured to calculate differences between a target signal d(t) and each of the (K+1) path filtering signals to obtain (K+1) path error signals;
a fusion unit, configured to perform a minimum-value fusion process to the (K+1) path error signals to obtain a residual signal e(t); and
an output unit, configured to output the residual signal e(t) as a final self-adaptive echo cancellation.

10. The apparatus according to claim 9, wherein a pre-distortion mapping function used in the pre-distortion process meets the following equation:

$$r_k(t)=f_k(p_k(t))$$

where $r_k(t)$ is a $k^{th}$-path pre-distorted signal, $p_k(t)$ is a $k^{th}$-path preprocessed signal, $f_k(x) \neq cx$, $f_k(x) \neq c$, $x=p_k(t)$ is a constant, and k=1, 2, \ldots, K.

11. The apparatus according to claim 10, wherein to control an input range and an output range of the pre-distortion mapping function by normalization, the pre-distortion mapping function meets the following equation:

$$r_k(t) = x_{max} f_k\left(\frac{p_k(t)}{x_{max}}\right)$$

where $x_{max}$ is a maximum amplitude of the downlink reference signal x(t), $-1<=f_k(x)<=1$, $x=p_k(t)/x_{max}$, and k=1, 2, \ldots, K.

12. The apparatus according to claim 9, wherein when an echo path model in the self-adaptive filter is a time-domain model $h_{k,t}$, the (K+1) path error signals are represented as follows:

$$e_0(t) = d(t) - y_0(t),$$

$$y_0(t) = h_{0,t} \otimes x(t) = \sum_{m=1}^{M} h_{0,t}(m) x(t - M + m),$$

$$e_k(t) = d(t) - y_k(t),$$

-continued $$y_k(t) = h_{k,t} \otimes r_k(t) = \sum_{m=1}^{M} h_{k,t}(m) r_k(t - M + m),$$

where $e_0(t)$ is the error signal corresponding to the downlink reference signal $x(t)$, $d(t)$ is the target signal, $y_0(t)$ is the filtering signal corresponding to the downlink reference signal $x(t)$, $h_{0,t}$ is an $M^{th}$-order Finite Impulse Response (FIR) filter at a t time point,
$h_{0,t}=[h_{0,t}(1)\ h_{0,t}(2), \ldots, h_{0,t}(M)]^T$, $h_{0,t}$ are coefficients of the FIR filter $h_{0,t}$, $e_k(t)$ is an error signal corresponding to each of the K-path pre-distorted signals $r_k(t)$, $y_k(t)$ is an error signal corresponding to each of the K-path pre-distorted signals $r_k(t)$, $h_{k,t}$ is an $M^{th}$ FIR filter at a $K^{th}$ t time point, $h_{k,t}=[h_{k,t}(1), h_{k,t}(2), \ldots, h_{k,t}(M)]^T$, $k=1, 2, \ldots, K$, $h_{k,t}$ are coefficients of the FIR filter $h_{k,t}$, superscript T is a transposition symbol, $\otimes$ is a convolution symbol, t is a time index, M is an order number and satisfies the echo path model, M is within a range from $0.01*f_s$ to $f_s$, and $f_s$ is sampling frequency.

13. The apparatus according to claim 12, wherein the echo path model corresponding to each path pre-distorted signal is updated to:

$$h_{k,t+1} = h_{k,t} + \Delta h_{k,t},$$

where $\Delta h_{k,t}$, as an $M^{th}$-order vector, is the updated item of the coefficient of the self-adaptive filter, $h_{k,t+1}$ is an $M^{th}$-order FIR filter at a $K^{th}$ (t+1) time point, M is a positive integer, and $k=1, 2, \ldots, K$.

14. The apparatus according to claim 9, wherein when an echo path model in the self-adaptive filter is a frequency-domain model $H_{k,t}$, the (K+1) path error signals $e_0(t)$, $e_1(t), \ldots, e_K(t)$ are represented by:

$$e_0(t) = d(t) - y_0(t)$$

$$[y_0(t-(N-M)+1), y_0(t-(N-M)+2), \ldots, y_0(t)]^T = [0_{(N-M)\times M} I_{(N-M)\times(N-M)}] F^- [H_{0,t} \cdot R_{0,t}],$$

$$[y_k(t-(N-M)+1), y_k(t-(N-M)+2), \ldots, y_k(t)]^T = [0_{(N-M)\times M} I_{(N-M)\times(N-M)}] F^- [H_{k,t} \cdot R_{k,t}],$$

where $e_0(t)$ is the error signal corresponding to the downlink reference signal $x(t)$, $d(t)$ is the target signal, $y_0(t)$ is the filtering signal corresponding to the downlink reference signal $x(t)$, $e_k(t)$ is an error signal corresponding to each of the K-path pre-distorted signals $r_k(t)$, $y_k(t)$ is an error signal corresponding to each of the K-path pre-distorted signals $r_k(t)$, superscript T is a transposition symbol, $0_{(N-M)\times M}$ is a zero matrix having (N−M) rows and M columns, $I_{(N-M)\times(N-M)}$ is a (N−M)-by-(N−M) identity matrix, $F^-$ is an inverse discrete Fourier transform matrix, · is a dot product symbol, $H_{0,t}$ is an N-point vector at a t time point,
$R_{0,t}=F[x(t-N+1), x(t-N+2), \ldots, x(t)]^T$, $H_{k,t}$ is an N-point vector at a $K^{th}$ t time point,
$R_{k,t}=F[r_k(t-N+1), r_k(t-N+2), \ldots, r_k(t)]^T$, t is a time index, N is length of a signal frame, M is an order number, M is within a range from $0.01*f_s$ to $f_s$, and $f_s$ is sampling frequency.

15. The apparatus according to claim 14, wherein the echo path model corresponding to each path pre-distorted signal is updated to:

$$H_{k,t+1} = H_{k,t} + \Delta H_{k,t},$$

where $\Delta H_{k,t}$, as an $N^{th}$-order vector, is the updated item of the coefficient of the self-adaptive filter, $H_{k,t+1}$ is an N-point vector at a $K^{th}$ (t+1) time point, N is a positive integer, and $k=1, 2, \ldots, K$.

16. The apparatus according to claim 9, wherein the fusion unit comprises:
  a mapping sub-unit, configured to map the (K+1) path error signals to corresponding mapping signals using a reversible space mapping method;
  a metric value obtaining sub-unit, configured to calculate metric values of the corresponding mapping signals using a predetermined minimum-value metric function;
  a searching sub-unit, configured to search a minimum metric value among the calculated metric values; and
  a residual signal obtaining sub-unit, configured to map the mapping signal which corresponds to the minimum metric value back to a space where the (K+1) path error signals stay, to obtain the residual signal $e(t)$.

* * * * *